United States Patent
Mishima et al.

(10) Patent No.: US 8,421,360 B2
(45) Date of Patent: Apr. 16, 2013

(54) LOAD DETERMINATION DEVICE AND ILLUMINATION APPARATUS USING SAME

(75) Inventors: Masanori Mishima, Souraku-gun (JP); Hiroshi Kido, Hirakata (JP); Shohei Yamamoto, Toyonaka (JP); Masanao Okawa, Hirakata (JP); Hirofumi Konishi, Hirakata (JP); Katunobu Hamamoto, Neyagawa (JP)

(73) Assignee: Panasonic Corporation, Osaka (JP)

( * ) Notice: Subject to any disclaimer, the term of this patent is extended or adjusted under 35 U.S.C. 154(b) by 258 days.

(21) Appl. No.: 13/071,762

(22) Filed: Mar. 25, 2011

(65) Prior Publication Data
US 2011/0234104 A1 Sep. 29, 2011

(30) Foreign Application Priority Data
Mar. 26, 2010 (JP) ................ 2010-073148

(51) Int. Cl.
  *H01J 7/42* (2006.01)
(52) U.S. Cl.
  USPC ............. 315/129; 315/224; 315/307
(58) Field of Classification Search .......... 315/129, 315/133, 291, 307, 308, 224
  See application file for complete search history.

(56) References Cited

U.S. PATENT DOCUMENTS

| | | | |
|---|---|---|---|
| 7,129,652 B2 * | 10/2006 | Patel et al. ............ | 315/291 |
| 7,521,876 B2 * | 4/2009 | Keith et al. ............ | 315/291 |
| 7,589,472 B2 * | 9/2009 | Keith et al. ............ | 315/94 |
| 8,125,154 B2 * | 2/2012 | Hui et al. ............ | 315/46 |
| 8,310,166 B2 * | 11/2012 | Nagaoka ............ | 315/209 R |
| 2007/0210723 A1 * | 9/2007 | Kumagai et al. ....... | 315/209 M |
| 2008/0315787 A1 | 12/2008 | Xu | |
| 2010/0026188 A1 * | 2/2010 | Hui et al. ............ | 315/129 |

FOREIGN PATENT DOCUMENTS

| | | |
|---|---|---|
| DE | 20 2006 006 417 U1 | 11/2006 |
| DE | 20 2007 015 857 U1 | 1/2008 |
| EP | 1 973 385 A1 | 9/2008 |
| JP | 2001210490 | 8/2001 |

OTHER PUBLICATIONS

European Search Report corresponding to European Application No. EP 11 00 2513, dated Oct. 6, 2011.

* cited by examiner

*Primary Examiner* — Don Le
(74) *Attorney, Agent, or Firm* — Bacon & Thomas, PLLC

(57) ABSTRACT

An illumination load determination device includes an illumination load; a voltage applying unit for applying a voltage to the illumination load; a connection unit for connecting the illumination load and the voltage applying unit; a detection unit for detecting at least one of a current flowing through the illumination load and a voltage across the illumination load when the voltage is applied to the illumination load from the voltage applying unit via the connection unit; and a determination unit for determining a type of the illumination load based on an output from the detection unit. The determination unit has a comparator for comparing a detection value detected by the detection unit to a predetermined threshold, and determines that the illumination load has a capacitance based on an output of the comparator. The voltage applying unit lights on the determined illumination load with a rated driving voltage.

8 Claims, 10 Drawing Sheets

LOAD DETERMINATION DEVICE AND ILLUMINATION APPARATUS USING SAME

FIELD OF THE INVENTION

The invention relates to a load determination device and an illumination apparatus using the same, for determining and lighting an illumination load.

BACKGROUND OF THE INVENTION

Conventionally, a discharge lamp lighting device including a load determination device is disclosed in Japanese Patent Application Laid-open No. 2001-210490. The discharge lamp lighting device is used in common to light on various kinds of discharge lamps such as a fluorescent lamp and a high-intensity discharge (HID) lamp, each having a different electrical property. In order to light on each of the discharge lamps appropriately, the discharge lamp lighting device lights on the discharge lamp with a predetermined output properties upon starting up, and then identifies a type of the discharge lamp by detecting lighting properties (e.g., voltage, current, electric power) of the lamp, i.e., determines an illumination load based on the lighting properties of the lamp.

The illumination load may include an organic electroluminescence (hereinafter referred to as "organic EL") as well as an LED, and the lighting device is preferably common to these solid-state light emitting devices. The load determination device disclosed in the above Patent Document is adapted to determine a discharge lamp based on the properties of the discharge lamp. This technique is, however, difficult to be adapted to the determination of an organic EL and an LED because the solid-state light emitting devices have different properties from those of the discharge lamp. More specifically, in the above Patent Document, it determines a discharge lamp as the illumination load by detecting a discharge current without consideration of a capacitive component. In the case where there is an illumination load itself having a capacitance, such as an organic EL, however, the technique cannot be used as it is.

SUMMARY OF THE INVENTION

In view of the above, the present invention provides a load determination device and an illumination apparatus using the same, capable of determining and lighting on an illumination load, and more particularly capable of easily detecting and determining the illumination load even if the illumination load is an organic EL.

In accordance with a first aspect of the present invention, there is provided an illumination load determination device including: an illumination load; a voltage applying unit for applying a voltage to the illumination load; a connection unit for connecting the illumination load and the voltage applying unit; a detection unit for detecting a current flowing through the illumination load and/or a voltage across the illumination load when a voltage is applied to the illumination load from the voltage applying unit via the connection unit; and a determination unit for determining a type of the illumination load based on an output of the detection unit. In the load determination device, the determination unit has a comparator for comparing a detection value detected by the detection unit to a predetermined threshold, and, based on an output of the comparator, determines whether or not the illumination load has a capacitive component.

With such configuration, since whether or not the illumination load has a capacitance can be determined, the organic EL light emitting device whose capacitance is larger than that of the LED can be easily determined. This makes it possible to light on the illumination load with its rated driving voltage.

The determination unit preferably determines the illumination load by applying a voltage less than the rated driving voltage of the illumination load from the voltage applying unit.

Further, when determining that the illumination load has a capacitance, the determination unit preferably calculates the capacitance of the illumination load based on a maximum value detected by the detection unit in a predetermined period of time after a start of applying a voltage to the illumination load from the voltage applying unit.

The voltage applying unit may have an inductance through which an electric power is supplied to the illumination load, the inductance constituting a resonant circuit together with the capacitance of the illumination load. Further, when the illumination load is determined by the determination unit, the voltage applying unit preferably applies a voltage to the illumination load at a resonance frequency of the resonant circuit.

Further, the determination unit may determine the illumination load based on a resonance voltage from the resonant circuit.

Furthermore, the voltage applying unit preferably controls the power supply based on a value detected by the detection unit.

Still furthermore, the determination unit preferably changes the threshold with the time.

In accordance with a second aspect of the present invention, there is provided an illumination apparatus having the above-mentioned illumination load determination device.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Figure 1:
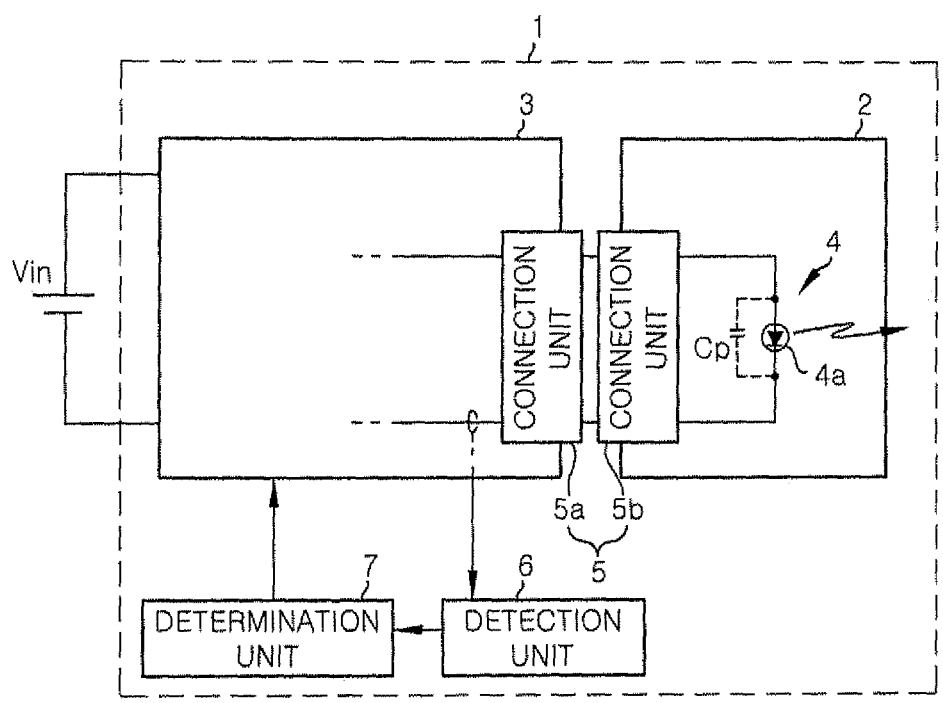
FIG. 1 is a block diagram of a load determination device in accordance with a first embodiment of the present invention.

Hereinafter, an embodiment of the present invention will be described, in more details, with reference to accompanying drawings forming a part hereof. Identical reference numerals are assigned to identical or similar components through the whole drawings, and redundant description thereof will be omitted.

First Embodiment

An illumination load determination device in accordance with a first embodiment of the present invention will be described in detail with reference to FIGS. 1 to 4. As shown in FIG. 1, a load determination device 1 (hereinafter, referred to as "determination device") of the first embodiment includes a load module 2 having an illumination load 4, a voltage applying unit 3, a connection unit 5 (5a and 5b), a detection unit 6, and a determination unit 7. The illumination load 4 and the connection unit 5b are modularized to provide the load module 2. Although the detection unit 6 is illustrated within the voltage applying unit 3 in FIG. 2, it may be provided independently of the voltage applying unit 3 as shown in FIG. 1. Herein, an organic electroluminescence device (hereinafter, referred to as "organic EL") 4a is provided as the illumination load 4, and "Cp" denotes a parasitic capacitance across the organic EL 4a. The organic EL device typically includes a light emitting substance disposed between facing electrode plates, which forms a condenser structure. Thus, the organic EL has a capacitance, i.e., the parasitic capacitance Cp.

The voltage applying unit 3 is supplied with a constant voltage by a power source Vin and generates a driving voltage for the illumination load 4. Further, the voltage applying unit 3 supplies a rated driving voltage via the connection unit 5 to the illumination load 4 determined by the determination unit 7. The connection unit 5, constituted by, e.g., a connector, has a connection unit 5a at the voltage applying unit 3 side and a connection unit 5b at the load module 2 side, which are interconnected with a power cable and the like.

The detection unit 6 detects at least one of a current flowing through the illumination load 4 and a voltage across the illumination load 4, when a voltage is applied to the illumination load 4 from the voltage applying unit 3. The determination unit 7 determines a type of the illumination load 4 based on an output from the detection unit 6. Specifically, based on a difference in parasitic capacitances of the organic EL and the LED, the organic EL with a larger capacitance is distinguishable from the LED. The load determination device 1 and the power source Vin are included in an illumination apparatus.

Figure 2:
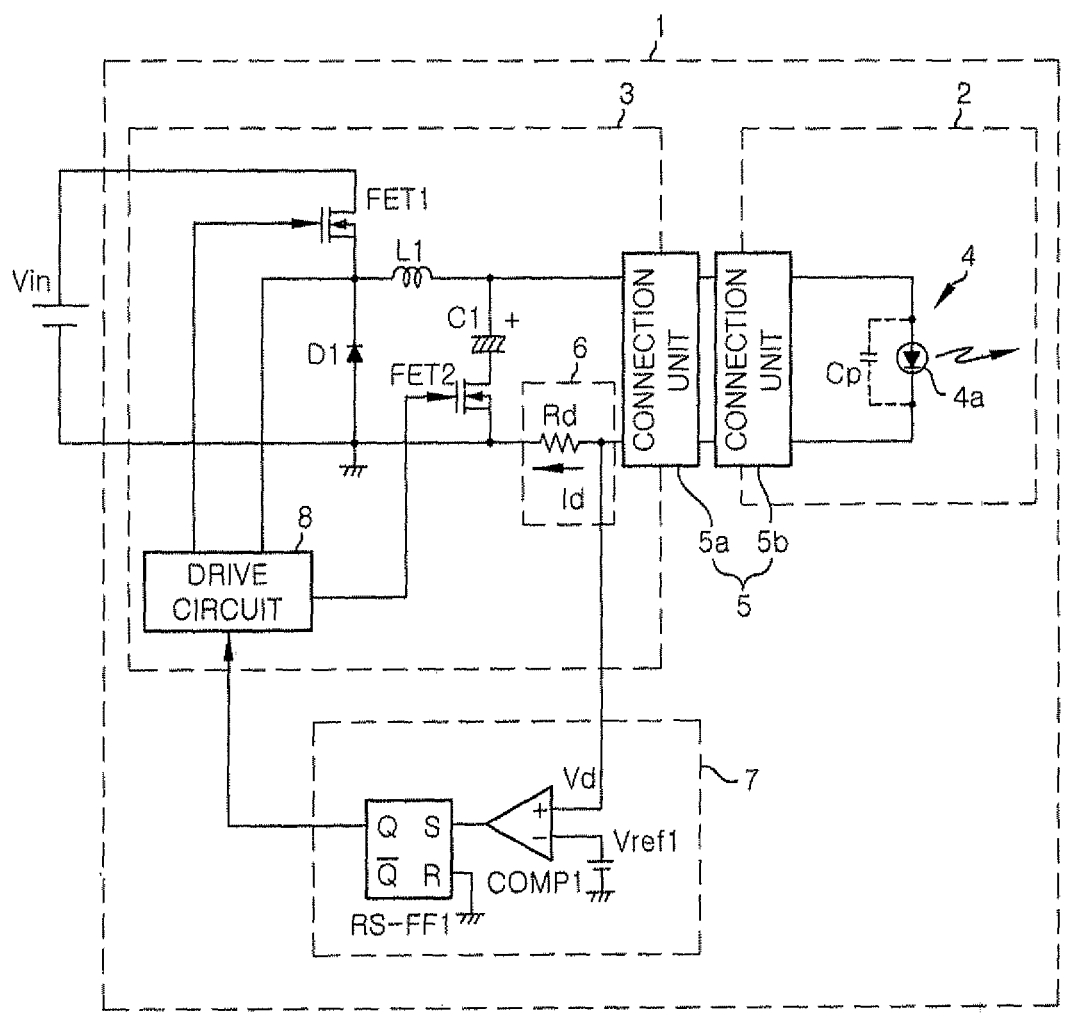
FIG. 2 is a circuit diagram of the load determination device.

As shown in FIG. 2, the voltage applying unit 3 includes semiconductor switching elements FET1 and FET2, a diode D1, a choke coil (inductance) L1, a capacitor C1, the current detecting unit (detection unit) 6, and a drive circuit 8. A series circuit formed from the FET1 and a reverse-connected diode D1 is connected to the power source Vin, and a series circuit including the choke coil L1, the electrolytic capacitor C1, and the FET2 is connected in parallel to the diode D1. A series circuit formed from the capacitor C1 and the FET2 is connected in parallel to a series circuit including the connection unit 5a and a resistor Rd.

The connection unit 5a and the connection unit 5b are connected with two terminals. The organic EL 4a as the illumination load 4 is connected to input terminals of the connection unit 5b, which causes the parasitic capacitance Cp. As a result, the organic EL device 4a and the parasitic capacitance Cp thereof are equivalently connected across the input terminals.

The current detecting unit 6 has the resistor Rd connected in series to the illumination load 4, and a connecting point between the resistor Rd and the connection unit 5a is connected to the determination unit 7. The current detecting unit 6 detects a current Id flowing through the resistor Rd, and supplies to the determination unit 7 as a detection voltage (detection value) Vd (=Id×Rd).

The determination unit 7 has a comparator COMP1, and a set-reset flip-flop RS-FF1 connected to an output terminal of the COMP1, and additionally includes a microcomputer for controlling the above components, a memory for storage, and the like. In the determination unit 7, the COMP1 compares the detection voltage Vd detected by the current detecting unit 6 to a reference voltage Vref1, i.e., a predetermined threshold, and whether or not the illumination load 4 has a capacitance is determined based on an output of the COMP1.

More specifically, the detection voltage Vd from the current detecting unit 6 is inputted to a positive input terminal of the COMP1, the reference voltage Vref1 is connected to the negative input terminal thereof, and the output of the COMP1 is inputted to a set input terminal S of the RS-FF1. The output of the COMP1 becomes a high (H) level when a voltage inputted to the positive input terminal of the COMP1 exceeds a voltage inputted to the negative input terminal thereof, while it becomes a low (L) level when not exceed. Accordingly, the H level signal is supplied to the RS-FF1 when the detection voltage Vd exceeds the reference voltage Vref1.

The output from the COMP1 is inputted to a set-input terminal S of RS-FF1, and a reset-input terminal R is grounded. The RS-FF1 operates to output a H level signal from Q terminal thereof when the H level signal is inputted to the S terminal of the RS-FF1, and to keep the output of Q terminal at the L level before the H level signal is inputted from the COMP1. The output of the RS-FF1 is inputted to the drive circuit 8 as a load determination signal.

The drive circuit 8 serves as a control circuit for driving to control switching of the FET1, and includes a control unit, e.g., a microcomputer (not shown) and a storage unit, e.g., a memory. The drive circuit 8 stores in the memory information on the rated voltage for driving normally the illumination load 4 determined by the determination unit 7.

For example, when receiving the load determination signal in which the illumination load 4 is determined to be the organic EL based on the output of the RS-FF1, the drive circuit 8 transmits a control signal for driving the organic EL 4a serving as the illumination load 4 to and controls the FET1. Accordingly, the predetermined rated driving voltage can be outputted to the illumination load 4 from the voltage applying unit 3. As the control signal, for example, the PWM (Pulse Width Modulation) control signal or the like may be employed, which is constituted by a pulse signal.

The voltage applying unit 3 serves as a so-called step-down chopper circuit which supplies a power to a load from the power supply Vin via the FET1 by turning on and off the FET1 at a high frequency by the drive circuit 8. That is, when the FET1 is turned on, the voltage applying unit 3 supplies the current to the illumination load 4 through a path of the power source Vin, the FET1, the choke coil L1, the connection unit 5a, the connection unit 5b, the illumination load 4, the connection unit 5b—the connection unit 5a, the resistor Rd, and the power source Vin. When the FET1 is turned off, an energy accumulated in the choke coil L1 is supplied to the illumination load 4 through a path of the choke coil L1, the connection unit 5a, the connection unit 5b, the illumination load 4, the connection unit 5b, the connection unit 5a, the resistor Rd, the diode D1, and the choke coil L1.

The capacitor C1 is a smoothing capacitor for smoothing the voltage supplied to the illumination load 4 into DC voltage. After the load determination, the FET2 is turned on and thereby one end of the capacitor C1 is grounded. Accordingly, the voltage across the illumination load 4 at the time of lighting can be stabilized, which suppresses a flicker or the like. Further, at the time of the load determination, since the influence of the capacitor C1 is eliminated by turning off the FET2, a level of a surge current generated in determining the load can be made higher, thereby making the load determination easier.

Figure 3:
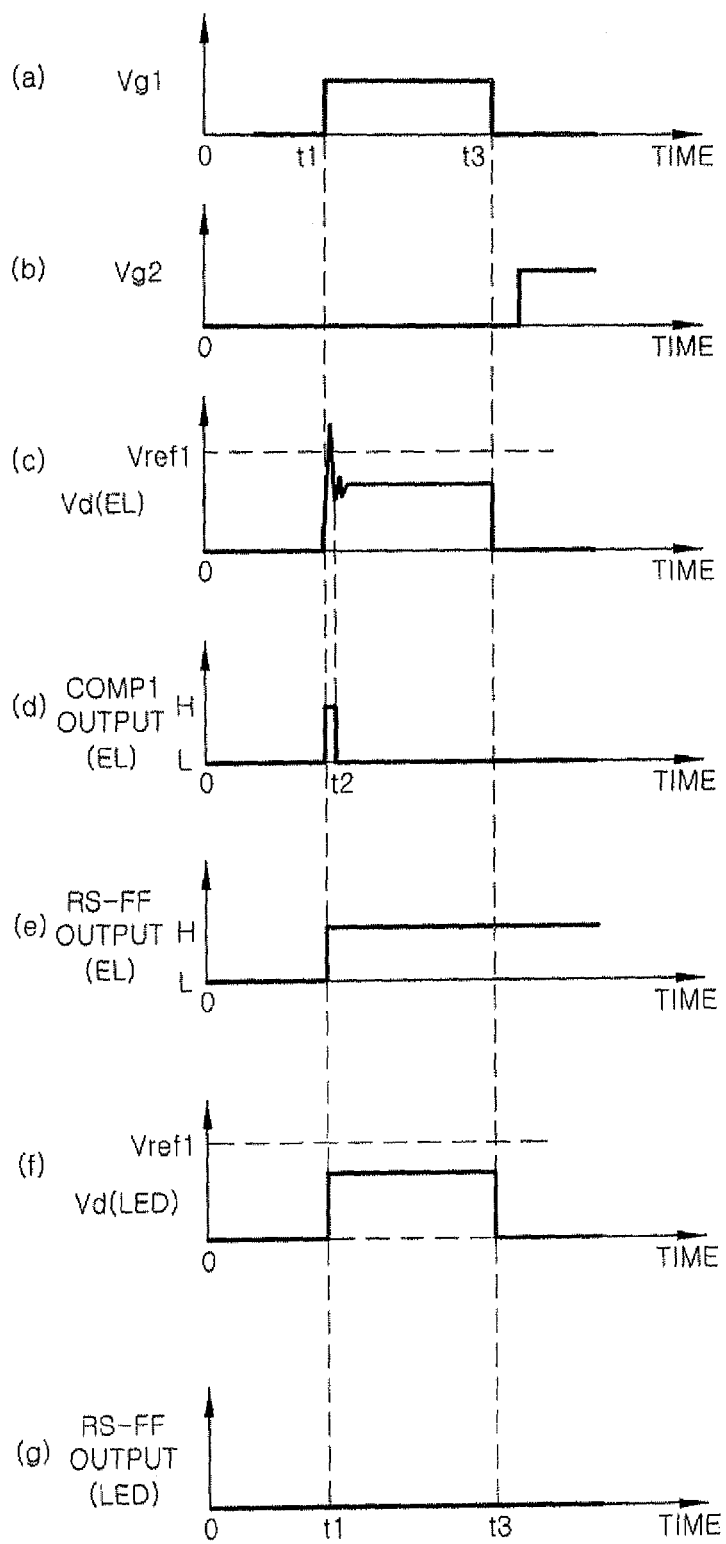
FIG. 3 shows output waveform charts at respective parts of the load determination device in load determination operation.

Next, load determination operation of the determination unit 7 will be described with reference to FIG. 3. In FIG. 3, (a) shows a waveform of a gate voltage Vg1 inputted into the FET1 from the drive circuit 8 in order to determine the illumination load 4 when the illumination load 4 is turned on. (b) shows a waveform of a gate voltage Vg2 inputted into the FET2 from the drive circuit 8. (c) shows a waveform of the detection voltage Vd from the current detecting unit 6 and the reference voltage Vref1 in the case where the organic EL 4a is employed as the illumination load 4, (d) shows an output waveform of the COMP1 at that time, and (e) shows an output waveform of the RS-FF1 at that time. Further, (f) shows a waveform of the detection voltage from the current detecting unit 6 and the reference voltage Vref1 in the case where the LED is employed as the illumination load 4, and (g) shows an output waveform of the RS-FF1 at that time.

As shown in (a) of FIG. 3, when determining the load, the drive circuit 8 outputs a pulsewise gate voltage Vg1 to turn on the FET1 during the time t1 to t3 Further, the drive circuit 8 outputs the gate voltage Vg2, as shown in (b) of FIG. 3, in the H level after the load determination. Since the FET2 is turned off by the gate voltage Vg2 and thereby the capacitor C1 is not grounded during the time period t1 to t3, there is no need to consider the influence of the capacitor C1. After the load determination, the FET2 is turned on.

The FET1 is turned on at the time t1 and off at the time t3 based on the gate voltage Vg1 from the drive circuit 8. When the inductance of the choke coil L1 is very small, the voltage waveform nearly similar to the waveform shown in (a) of FIG. 3 is applied across the illumination load 4. Further, when the illumination load 4 is the organic EL 4a, the illumination load 4 includes the parasitic capacitance Cp. Accordingly, a surge current for charging the parasitic capacitance Cp flows through the current detecting unit 6 at an initial time of applying the gate voltage Vg1 by the drive circuit 8, so that a peak current (voltage) occurs at the detection voltage Vd (EL) in the current detecting unit 6 as shown in (c) of FIG. 3. The determination unit 7 compares the detection voltage Vd (EL) to the predetermined reference voltage Vref by the COMP1. During the time t1 to t2 in which the detection voltage Vd exceeds the reference voltage Vref, the output of the COMP1 becomes H level as shown in (d) of FIG. 3. When the output signal of the H level from the COMP1 is inputted to the set-input terminal of the RS-FF1, the output terminal Q of the RS-FF1 becomes the H level as shown in (e) of FIG. 3.

On the other hand, when the illumination load 4 is the LED, the LED can be equivalently regarded as a resistance load because the parasitic capacitance Cp thereof is extremely small as compared with that of the organic EL device 4a. Thus, the surge current hardly occurs at the detection current Id of the current detecting unit 6, and the detection voltage Vd (LED) based on the detection current Id exceeds the reference voltage Vref as shown in (f) of FIG. 3. Accordingly, the output of the RS-FF1 remains in the L level.

When the Q output of the RS-FF1 is in the H level, the determination unit 7 determines that the illumination load 4 connected thereto is the organic EL 4a, and when the Q output of the RS-FF1 is in the L level, determines that the illumination load 4 is the LED. When it is determined that the illumination load 4 is the organic EL and the H level signal is inputted from the RS-FF1, the drive circuit 8 inputs the driving control signal, such as a PWM signal, to the FET1 to generate the rated drive voltage for the organic EL 4a corresponding to the H level, the rated drive voltage being predetermined. Accordingly, switching of the FET1 is controlled and the organic EL device 4a is driven by the output of the FET1.

When the LED is employed as the illumination load 4, the L level signal from the Q output of the RS-FF1 is inputted to the drive circuit 8. The drive circuit 8 inputs the driving control signal to the FET1 to generate the rated drive voltage for the LED corresponding to the L level. As in the organic EL 4a, the drive circuit 8 controls switching of the FET1, and drives the LED by the output of the FET1.

In either of the organic EL device 4a and the LED, after the time t3, the drive circuit 8 turns on the FET2 by outputting the gate voltage Vg2 to thereby ground the capacitor C1. The output of the FET1 is smoothed by capacitor C1 and supplied to the illumination load 4. Thus, a flicker due to such as a steep power fluctuation or an external noise can be suppressed.

After it is determined that the illumination load 4 is the organic EL 4a, the drive circuit 8 can switch the FET1 by supplying a square wave voltage serving as the driving control signal where a slope of the rising square wave is lowered when turning the organic EL 4a on, thereby suppressing a peak of the surge current at the time of lighting. Furthermore, a poor smoothing property of the electrolytic capacitor C1 at high-frequency can be improved.

After the load determination, the drive circuit 8 may control to prolong the ON-time of the FET1 such that each illumination load is lit with its rated driving voltage. Note that, when a conventional hot cathode fluorescent lamp or high-pressure discharge lamp is connected, few voltages generate across the resistor Rd of the current detecting unit 6 because these lamps have an equivalently infinite resistance. For that reason, another threshold for these lamps may be set to determine them. Alternatively, the connection unit 5 may be designed such that only a solid-state light emitting device such as the organic EL and the LED can be connected. This makes it possible to eliminate a need to provide another threshold for the conventional hot cathode fluorescent lamp or high-pressure discharge lamp.

Figure 4:
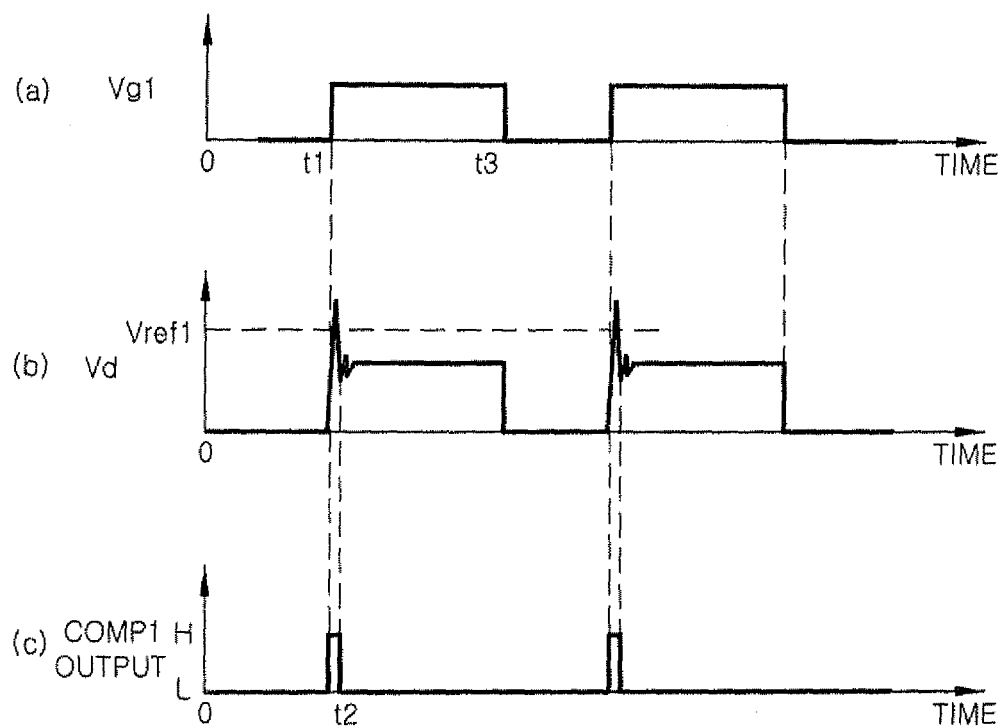
FIG. 4 gives output waveform charts at respective parts of the load determination device in a plurality of load determination operations.

Meanwhile, in the case where the peak current is not detected by only one detection of the surge detection voltage Vd, a plurality of detections may be carried out, which will be described with reference to FIG. 4. In FIG. 4, (a) shows a pulse waveform for the determination applied to the FET1 from the drive circuit 8 twice successively, (b) shows a waveform of the detection voltage Vd from the current detecting unit 6 at that time, and (c) shows an output waveform of the COMP1. Herein, the H level signal is outputted from the COMP1 in a period of time t3 to t4, in addition to the period of the time t1 to t2. Accordingly, a plurality of determinations can be carried out by supplying a plurality of pulses for the determination successively from the drive circuit 8 at the starting-up, which improves accuracy of the load determination.

With the present embodiment, it is possible to determine the illumination load 4 with a capacitance. Therefore, even though the organic EL 4a whose capacitance is larger than that of the LED is used as the illumination load 4, the organic EL 4a can be distinguished from the LED easily. This determination allows the organic EL 4a to light on with the rated driving voltage Vn. Further, when the illumination load 4 includes only the LED without the organic EL 4a, it can be lit on with the rated driving voltage of the LED. Accordingly, the lighting circuit such as the voltage applying unit 3 can be used in common.

With the present embodiment, since the reference voltage Vref is appropriately provided in advance as a predetermined threshold, the determination of capacitive loads is made possible only by comparing the detection voltage Vd detected by the current detecting unit 6 to the reference voltage Vref. This makes it easier to determine the organic EL. Furthermore, after the determination, since the smoothing operation can be carried out by the capacitor C1 by turning on the FET2, a flicker due to the power fluctuation and noise can be suppressed even when the current is unstable due to, e.g., the PWM control and the like, especially at the time of a dimming control or the like. Still furthermore, the connection unit 5 can be used in common for the organic EL and LED loads because the organic EL load is distinguishable. Besides, the voltage applying unit 3 can be made common, and thereby turn them on with the respective rated driving voltages.

Further, the current detecting unit 6 can be realized by a simple current detecting circuit, e.g., the resistor Rd, thereby miniaturizing the circuit. The determination unit 7, additionally, can be realized by a simple structure including, e.g., the comparator and the flip-flop, which makes circuit integration easier. Besides, an incorrect connection can be prevented by making the connection unit 5 different from connectors for the hot cathode fluorescent lamp and high-pressure discharge lamp.

The determination unit 7 may determine that the illumination load 4 has a capacitance in the case where, after the beginning of applying the voltage from the voltage applying unit 3 to the illumination load 4, the difference between the maximum value of the detection voltage Vd in a predetermined period (e.g., a surge current generation period of the time period t1 to t2) and the maximum value after a lapse of the predetermined period is larger than a predetermined threshold.

The determination unit 7 is not limited to the above configuration but various modifications are available. For example, the detection voltage Vd may be analog/digital converted to be processed by a microcomputer. Further, the current detecting unit 6, the determination unit 7, and the drive circuit 8 may be integrated into one IC chip, which leads to a scaling down of the device size.

Modification of the First Embodiment

A modification of the above embodiment will be described with reference again to FIG. 2. The modification has the same configuration as the first embodiment, but has a difference in that the capacitance of the illumination load 4 is calculated based on the maximum value among the detection values from the current detecting unit 6 in the predetermined period after the beginning of applying the voltage from the voltage applying unit 3 when the determination unit 7 determines that the illumination load 4 has a capacitance.

The determination unit 7 has a peak hold circuit (not shown) for detecting and holding the maximum voltage from the current detecting unit 6 and, for example, when the determination unit 7 determines that the illumination load 4 is the organic EL, the peak voltage (Vp) of the detection voltage Vd from the current detecting unit 6 is held in the peak hold circuit. The peak voltage Vp is in proportion to the capacitance value C of the illumination load 4 to provide a relationship of Vp=α·C (α is a constant). The constant "α" is obtained by measuring a peak voltage Vp when a known capacitor is connected instead of the illumination load 4. Then, the capacitance value C of the illumination load 4 may be calculated based on the constant "α" and the measured peak voltage Vp by a microcomputer or a arithmetic unit of a dedicated IC.

As the above, the determination unit 7 can detect the absolute value of the capacitance C and determine whether or not the illumination load 4 has a capacitance. Accordingly, for example, when the load is determined, a change in the capacitance values with a lapse of time is stored and then a lifespan of the load 4 is estimated based on the change and informed users of it. Further, if the capacitance value changes rapidly, the determination unit 7 may determine that an abnormal condition occurs. In this case, the device may be protected by stopping the operation circuit.

Second Embodiment

Figure 5:
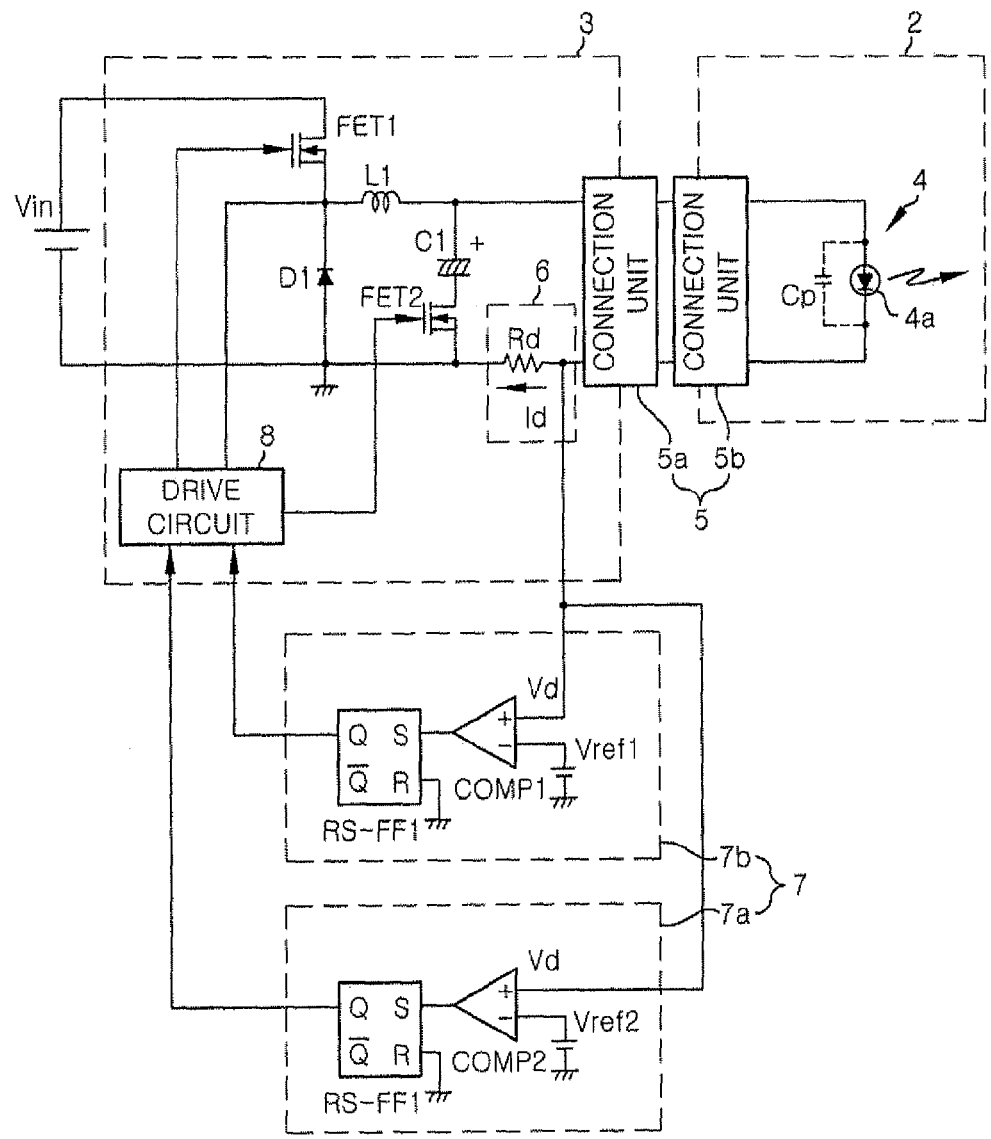
FIG. 5 is a block diagram of a load determination device in accordance with a second embodiment of the invention.

The load determination device in accordance with the second embodiment of the present invention will be described with reference to FIG. 5. The present embodiment is different from the above embodiments in that there are provided a plurality of determination units 7a and 7b each of which has respective reference voltages Vref1 and Vref2 of different thresholds from each other.

In the second embodiment, the organic EL device 4b serving as the illumination load 4 has electrode plates twice in area compared to that of the organic EL device 4a used in the first embodiments while remaining identical in internal structure. In this regard, because a capacitance is in proportion to an area of the electrode plates, the parasitic capacitance of the organic EL 4b becomes 2Cp. Further, the detection voltage Vd detected by the current detecting unit 6 has approximately twice the peak value.

In the present embodiment, if the reference voltage Vref1 is defined as a threshold for determining the organic EL 4a with the parasitic capacitance Cp, and the reference voltage Vref2 is defined as a threshold for determining the organic EL 4b with the parasitic capacitance 2Cp, the reference voltage Vref2 has twice the value of the reference voltage Vref1, i.e., Vref2=2×Vref1.

The determination unit 7b has the same configuration as the determination unit 7a, and has a comparator COMP2 and a flip-flop RS-FF2. As in the determination unit 7a, the detection voltage Vd from the current detecting unit 6 is inputted into the positive input terminal of the COMP2, the reference voltage Vref2 is inputted into the negative input terminal thereof, and an output terminal of COMP2 is connected to the RS-FF2. The COMP2 supplies an H level signal to the RS-FF2 when the detection voltage Vd exceeds the reference voltage Vref2.

In the RS-FF2, an output of the COMP2 is inputted into S terminal, and R terminal is grounded. When the H level signal is outputted from the COMP2, an output of Q-terminal of the RS-FF2 becomes H level. Before the H level signal is outputted from the COMP2, the output of Q-terminal is kept at L level. Then, the output of the RS-FF2 is inputted into the drive circuit 8.

From the RS-FF1 and RS-FF2 of the determination units 7a and 7b, the respective load determination signals are inputted to the drive circuit 8. When both the outputs of RS-FF1 and RS-FF2 are in the H level, the drive circuit 8 determines that the illumination load 4 is the organic EL 4b, and outputs a driving control signal corresponding to the organic EL 4b. When both the outputs of RS-FF1 and RS-FF2 are in the L level, the drive circuit 8 determines that the illumination load 4 is the LED, and outputs the driving control signal for driving the LED.

With the present embodiment, since there are provided a plurality of determination units 7a and 7b each of which has respective reference voltages Vref1 and Vref2 of different thresholds from each other, the organic ELs having a different capacitance can be determined as well as the organic EL and the LED can be distinguished from each other. Therefore, even when a plurality of organic ELs with the same capacitance are provided in the load module 2, and a plurality of the load modules 2, each having the same organic EL, are connected in parallel by using a plurality of connection units, the number of modules connected thereto is detectable. Further, since the values and the number of thresholds are adjustable, the threshold can be set appropriately according to the illumination load to be determined.

Modification of the Second Embodiment

Figure 6:
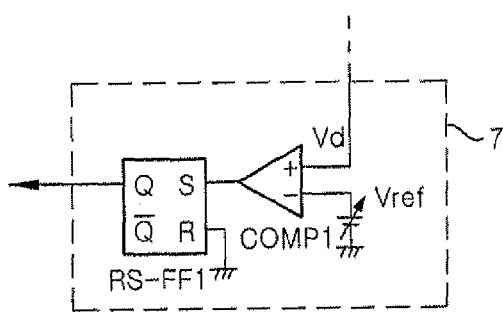
FIG. 6 is a circuit diagram of a modified example of the load determination device shown in FIG. 5.

A modification of the second embodiment will be described with reference to FIGS. 6 and 7. In the modified example, as shown in FIG. 6, the reference voltage Vref provided in the negative input terminal of the COMP1 of the determination unit 7 is variable with time.

Figure 7:
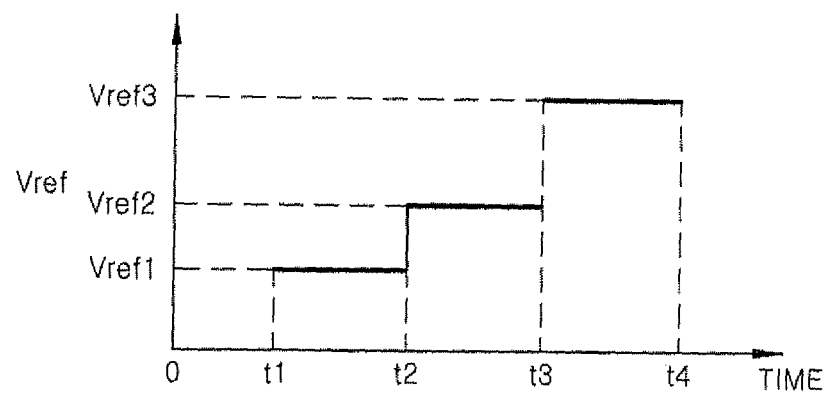
FIG. 7 is a diagram showing a relationship between reference voltages of the determination unit and the time in the load determination device shown in FIG. 5.

As shown in FIG. 7, the determination unit 7 raises stepwisely the reference voltage Vref by three stages sequentially within the determination period of the time t1 to t4 in response to a control signal from a timer (not shown) which counts time. That is, the thresholds are set as a reference voltage Vref1 during the time period t1 to t2, as Vref2 during t2 to t3, and as Vref3 during t3 to t4, where Vref1<Vref2<Vref3.

A peak-hold circuit (not shown) of the determination unit 7 holds the peak voltage of the detection voltage Vd inputted into the COMP1 during the determination period (the time t1 to t4) as a peak-hold voltage. The COMP1 compares the peak-hold voltage to the respective reference voltages Vref1, Vref2, and Vref3 sequentially to determine the illumination load 4. Instead of employing the peak-hold circuit, the detection voltage Vd may be detected by switching the FET1 with the determination pulses from the driving circuit 8 every determination periods corresponding to each of the reference voltages Vref1, Vref2, and Vref3, and then the peak voltages at the every determination periods may be compared to the respective reference voltages Vref1, Vref2, and Vref3. Further, the reference voltage Vref may be changed by three stages or the more.

With the modified example, the three-stage reference voltages Vref1, Vref2, and Vref3 can be made in only one circuit, thereby miniaturizing the determination circuit. Besides, the Q output of the RS-FF1 may be detected in response to the time t1 to t4. Further, the reference voltages Vref1 to Vref3 are not necessary to be set at equal intervals but may be set properly based on the capacitance of the illumination load to be determined.

Third Embodiment

A load determination device in accordance with a third embodiment of the present invention will be described with reference to FIG. 8. The present embodiment has the same configuration as the above embodiments. In the present embodiment, the voltage applying unit 3 applies a voltage smaller than the rated driving voltage of the illumination load 4 to the illumination load 4 and the determination unit 7 determines the illumination load 4. In the load determination device 1 of the present embodiment (see FIG. 2), the organic EL is employed as the illumination load 4.

Figure 8:
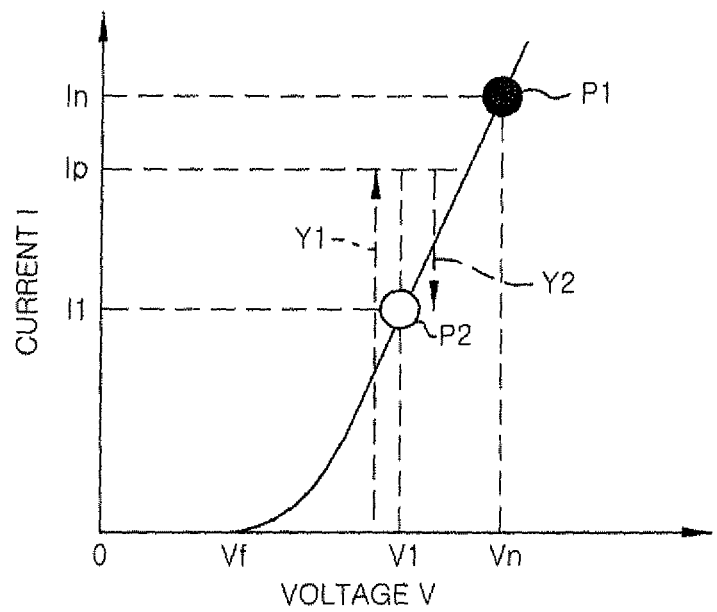
FIG. 8 is a voltage-current characteristic curve of the organic EL for describing operation of a load determination device in accordance with a third embodiment of the invention.

As shown in FIG. 8, the organic EL has voltage-current characteristics in which, when a load voltage V is applied to exceed a start-up voltage Vf of the organic EL, a load current I starts flowing and increases as the load voltage V increases. In FIG. 8, a black circle P1 on the characteristic curve denotes the rated operating point (the rated voltage Vn and the rated current In) of the organic EL, and a white circle P2 represents an operating point of the load voltage V1 initially applied to the organic EL.

When the determination unit 7 determines the illumination load 4, the voltage applying unit 3 inputs a square wave voltage V1 lower than the rated voltage Vn to the illumination load 4 from the drive circuit 8 as a driving voltage. At this time, the peak current Ip occurs in the load current I of the organic EL due to its surge current and temporarily flows beyond the voltage-current characteristics as shown by an arrow Y1 in FIG. 8. After the surge state, as shown by an arrow Y2, the load current I converges on a constant current I1 to be stabilized. In this state, the current I1 and the load voltage V1 become an operating point for a dimming control. Subsequently, when the determination is finished, the illumination load 4 is turned on at the voltage Vn and the current In of the rated operating point P1 which is arbitrarily decided by the user. Note that a value of the start-up voltage Vf substantially depends on the device.

Since the start-up voltage Vf varies due to such as ambient temperature and aging variation of the organic EL, it is not preferable that the load voltage V1 applied to the organic EL is set in a vicinity of the Vf. By setting the load voltage V1 in advance so as to satisfy the relationship of Vf<V1<Vn, the peak current Ip is suppressed to remain lower than the rated current In. Especially, even when the organic EL is turned on at the time of determining the load, it is in a dimming control condition below the rated driving voltage. Therefore, as the operating point is smoothly moved from the white circle P2 to the black circle P1, the optical output is increased gradually and the user feels no incompatibility at the beginning of lighting.

Further, by setting in advance the load voltage V1 during the load determination such that it falls in a range of 0<V1<Vf, only the surge current may be detected without turning on the illumination load 4. When a level of the detection voltage Vd is low because the parasitic capacitance Cp is small, a value of the resistor Rd for the detection may be increased. This makes it possible to obtain higher level of the detection voltage. In this case, in order to prevent a circuit loss from increasing, a circuit for short-circuiting the resistor Rd after the load determination may be added.

With the present embodiment, since the load can be determined by using the load voltage V1 equal to or less than the rated voltage Vn, the peak current Ip can be suppressed. Therefore, it is possible to prevent the user from feeling as a flash a light-emitting from the organic EL due to the surge current during the load determination. Further, after the load determination, the load voltage V1 is increased gradually to the rated voltage Vn. Thus, it becomes difficult for the user to feel incompatibility caused by the peak current generated in determining a load by the determination circuit. Furthermore, the surge current is reduced, which decreases stress on circuit elements of the voltage applying unit 3 and the determination unit 7.

Fourth Embodiment

A load determination device in accordance with a fourth embodiment of the present invention will be described with reference to FIGS. 9 to 11. In the present embodiment, the voltage applying unit 3 has a resonant circuit constituted by a choke coil L1 (inductance) and a parasitic capacitor Cp of the illumination load 4, and supplies electric power to the illumination load 4 via the choke coil L1. When the determination unit 7 determines the illumination load 4, the voltage applying unit 3 applies a voltage having a resonance frequency of the resonant circuit to the illumination load 4.

Figure 9:
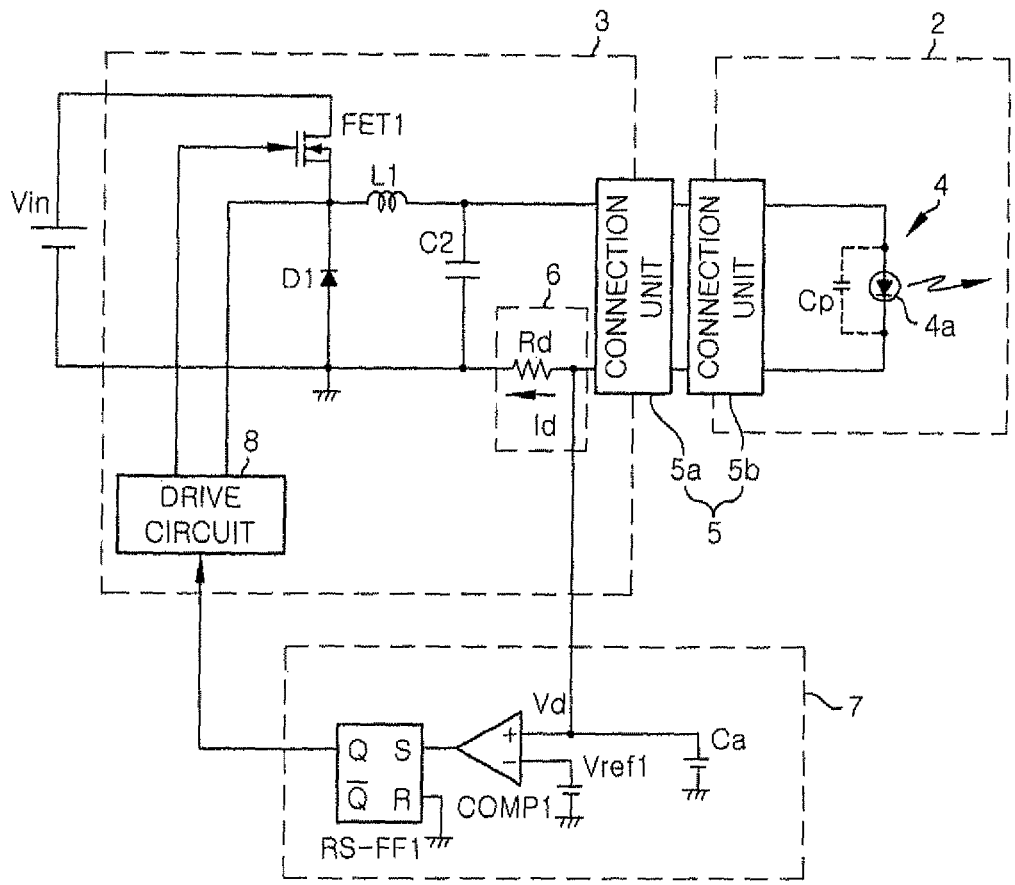
FIG. 9 is a block diagram of a load determination device in accordance with a fourth embodiment of the invention.
Figure 10:
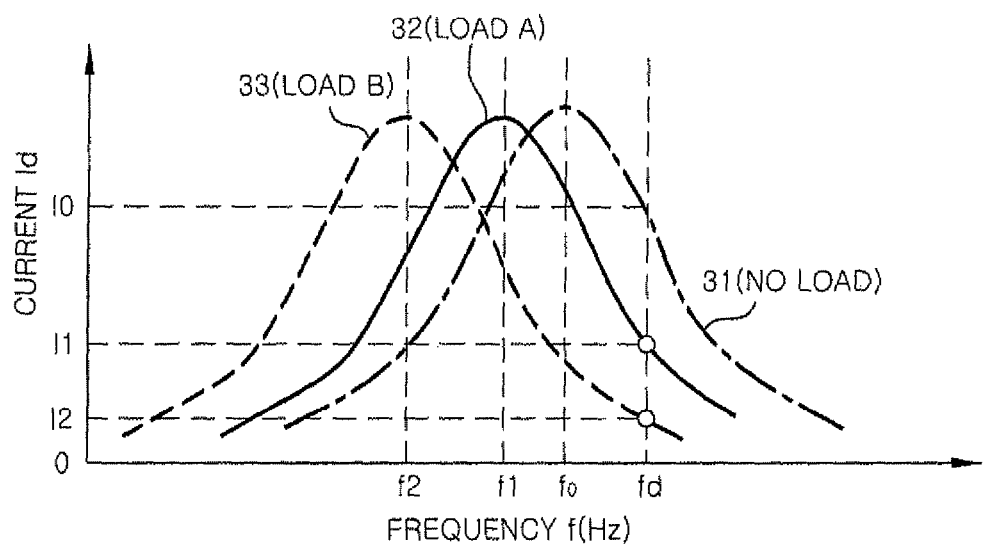
FIG. 10 is a current-frequency characteristic curve of a resonant circuit of a voltage applying unit in the load determination device shown in FIG. 9.

As shown in FIG. 9, the load determination device of the present embodiment is different from the above embodiments in that there are provided a resonance capacitor C2 instead of the series circuit of the capacitor C1 and the FET2 shown in FIG. 2, and a capacitor Ca connected in parallel to the resistor Rd for averaging the detection voltage Vd. Further, the detection voltage Vd has a sinusoidal waveform with the resonance frequency.

The drive circuit 8 turns on and off the FET1 at high frequency to generate a high-frequency square wave voltage at the connection point between the FET1 and the choke coil L1. By utilizing the square wave voltage, the current detecting unit 6 detects, through the resistor Rd, a current generated in a resonant circuit that is constituted by the choke coil L1, the capacitor C2, and the parasitic capacitance Cp of the organic EL 4a. The determination unit 7 determines the illumination load 4 based on the detection voltage Vd obtained from the current generated by the resonant circuit and averaged by the capacitor Ca. Note that, a value of the resistor Rd can be made fully small as compared with the resistance of the illumination load 4 because it is used only for detecting the current.

Next, with reference to FIG. 10, resonant operation of the resonant circuit will be described. FIG. 10 shows frequency characteristic curves of the detection current Id flowing in the resonant circuit. The resonance curve 31 (alternate long and short dash line) shows the characteristics with no load (the illumination load is not connected). The resonance curve 32 (the solid line) shows the characteristics with a load A in which one piece of the organic EL (the parasitic capacitance Cp) is connected thereto as the illumination load 4. The resonance curve 33 (the dotted line) shows the characteristics with a load B in which two pieces of the organic ELs (the parasitic capacitance 2 Cp) are connected thereto. Each of the resonance frequencies f0, f1, and f2 in the resonance curves 31, 32, and 33 is represented by the respective equations 1 to 3. At the time of no-load;

$$f0=1/\{2\pi(L1\cdot C2)^{1/2}\} \qquad (eq. 1)$$

At the time of the load A;

$$f1=1/\{2\pi\cdot(L1\cdot(C2+Cp))^{1/2}\} \qquad (eq. 2)$$

At the time of the load B;

$$f2=1/\{2\pi\cdot(L1\cdot(C2+2Cp))^{1/2}\} \qquad (eq.3)$$

Where, each of the resonance frequencies f0, f1, and f2 satisfies the relationship of f0>f1>f2, and each load has a different resonance frequency from each other.

Accordingly, in each of the resonance curves 31, 32, and 33, for example, when the circuit operates at a frequency fd higher than the resonance frequency f0, cross-points at which the frequency fd intersects with the respective resonance curves denote each of current values flowing through the resonant circuit. Namely, the current value at the no-load is I0, the one at the load A is I1, and the one at the load B is I2. Since each of the resonance characteristics has a skirt curve, the current values I1, I2, and I3 satisfy the relationship of I0>I1>I2. Thus, a resonant voltage across the resistor Rd varies depending on the illumination loads 4. Further, the resonance frequency of the resonant circuit is variable by changing the capacitance of the capacitor C2.

Then, the determination unit 7 detects a peak value, an effective value, or the like, of the resonance voltage, and determines the load by comparing the threshold thereto. Specifically, when the current is, e.g., I0, I1, or I2, the detection voltage Vd, which is detected through the resistance Rd in the current detecting unit 6, is compared to a predetermined threshold, and the load is determined based on the detection voltage Vd. In this embodiment, the detection voltage Vd is obtained not from the peak voltage caused by the surge current generated at the rise of the rectangular wave as in the above embodiment, but from the resonance voltage obtained based on the resonance current in the resonant circuit operating at the fixed high frequency fd.

Figure 11:
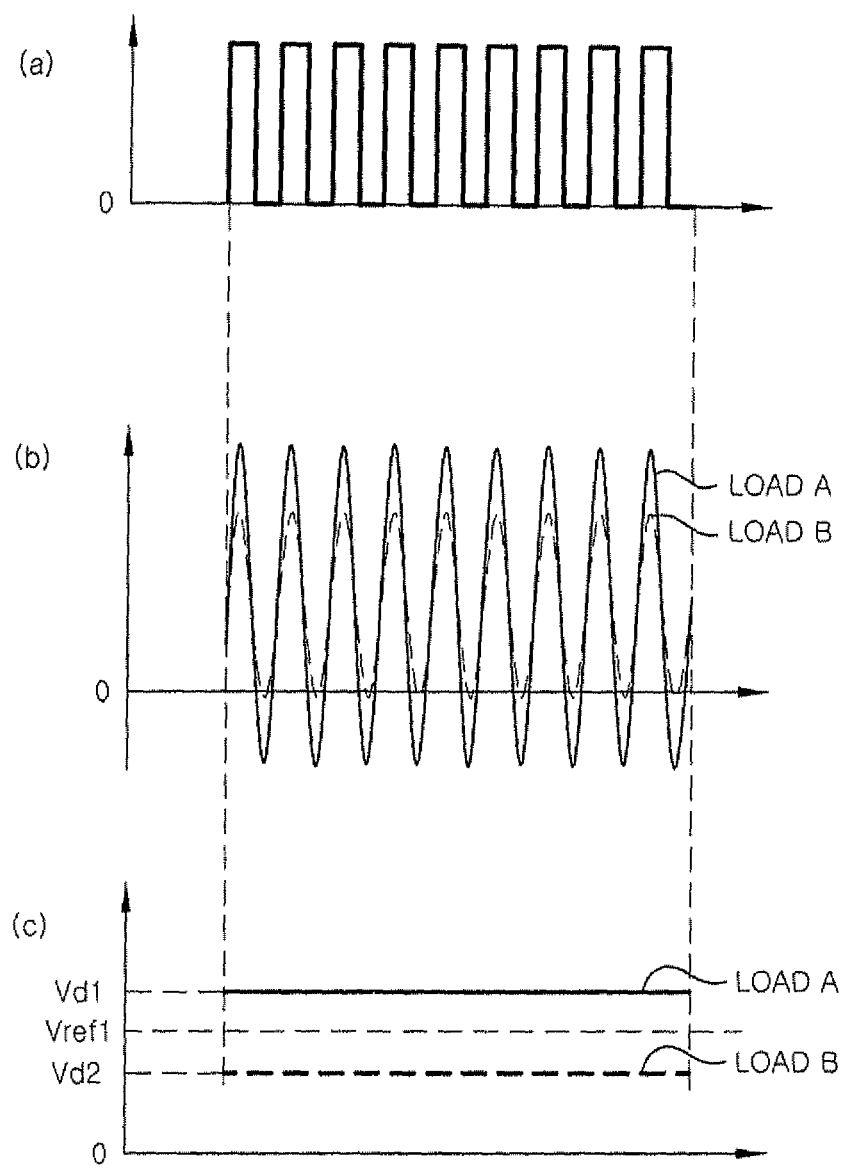
FIG. 11 illustrates output waveform charts at respective parts of the voltage applying unit shown in FIG. 9 in voltage applying operation.

Referring to FIG. 11, there will be described waveforms of the detection voltage Vd averaged by the capacitor Ca. In FIG. 11, (a) shows a voltage waveform at the connection point between the FET1 and the choke coil L1 when the FET1 is turned on and off with the rectangular wave voltage. (b) shows a non-averaged voltage waveform (solid line) across the resistor Rd when the load A is connected; and a non-averaged voltage waveform (dotted line) when the load B is connected. (c) shows an averaged voltage (solid line) when the load A is connected, an averaged voltage (bold dotted line) when the load B is connected and the reference voltage Vref (thin dotted line) of the threshold.

When the square wave output from the FET1 is supplied to the resonant circuit as shown in (a) of FIG. 11, the voltage across the resistor Rd becomes a sinusoidal wave as shown in (b) of FIG. 11. And then, the voltage is averaged by the capacitor Ca to form DC voltages as shown in (c) of FIG. 11, i.e., a detection voltage Vd1 at the load A, and a detection voltage Vd2 at the load B. Thus, the detection voltage Vd across the resistor Rd in the current detecting unit 6 is averaged by the capacitor Ca, and the high frequency detection voltage is smoothed, thereby obtaining the DC detection voltage. Then, the detection voltages Vd can be compared with the reference voltage Vref1 to thereby distinguish the load A and the load B.

As mentioned above, because the parasitic capacitances of the load A (parasitic capacitance Cp) and the load B (parasitic capacitance 2Cp) are different, the resonance characteristics are different, and thereby the detection currents, i.e., detection voltages are different at the fixed frequency fd (FIG. 10) of the driving control signal. As the parasitic capacitance becomes larger, or as the number of loads connected thereto is increased, the resonance frequency shifts lower. Accordingly, the detection voltage Vd becomes smaller, i.e., Vd1>Vd2.

With the present embodiment, the voltage applying unit 3 is provided with the resonant circuit including the parasitic capacitance of the illumination load 4, and thereby the illumination loads with various parasitic capacitances can be determined based on the resonance voltage generated in the resonant circuit. Thus, it is not only possible to distinguishing the LED with a relatively small parasitic capacitance and the organic EL with a relatively large parasitic capacitance, but also the size and the number of the organic ELs.

Further, the load is determined not based on the peak voltage based on the peak current of the surge current generated at the rise of the square wave, but on the direct voltage obtained from the successive sinusoidal wave generated in the resonant circuit. This makes it difficult the surge current to occur, thereby suppressing the peak current to reduce the stress on the circuit elements.

Further, since the resonance frequency can be selected by controlling the capacitance value of the capacitor C2, a range of the current detection is widened, and, for example, it is possible to detect only at a specified frequency (fd). Alternatively, a switching element may be connected in series to the capacitor C2 and turned on only at the time of the determination. Furthermore, the resonant circuit constituted by the choke coil L1 and the parasitic capacitance of the illumination load 4 in the circuit shown in FIG. 2 is available, and, in this case, the capacitance of the capacitor C2 is excluded from the resonance operation.

Further, frequency versus output characteristics of the resonant circuit for each illumination load may be stored. Thus, based on the characteristics, thresholds at different frequencies may be set for each load, and then the load may be determined by sweeping the frequency fd of the driving control signal in the determination by the determination unit 7.

Note that, by providing a DC-cut capacitor in the current path to the load, it is possible to change the voltage waveform shown in (b) of FIG. 11 to that which is approximately symmetric in positive and negative of voltage. In this case, the detection voltage Vd is detectable simply by a full-wave rectification. After the detection, both terminals of the DC-cut capacitor are preferably short-circuited by using a switching element or the like. Furthermore, in detecting the load current, it is possible to reduce stress on the switching element by detecting the load current at a delayed phase region whose frequency is higher than the resonance frequency f0.

Fifth Embodiment

Figure 12:
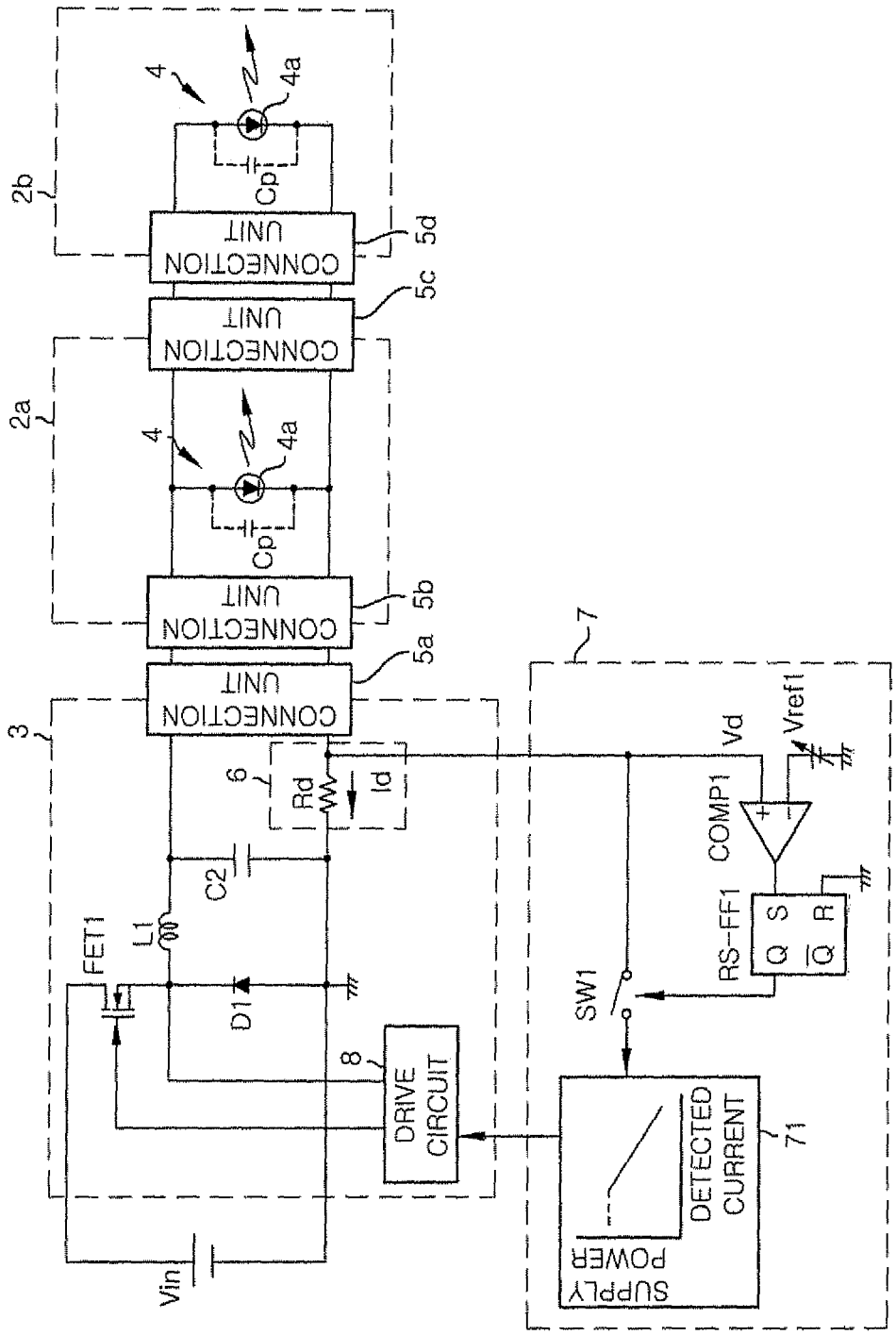
FIG. 12 is a block diagram of a load determination device in accordance with a fifth embodiment of the invention.

A load determination device in accordance with a fifth embodiment of the present invention will be described with reference to FIG. 12. The present embodiment is different from the above embodiments in that there are provided two load modules 2a and 2b with the same specification connected in parallel to each other; and the determination unit 7 is provided with a switch SW1 and a current-power conversion unit 71. In the present embodiment, the current detecting unit 6 detects the detection current Id (or, the detection voltage Vd) by using the above resonant circuit, and the determination unit 7 determines the load based on the detection voltage Vd. Then, the voltage applying unit 3 adjusts a power supply to the illumination load 4 based on a detected value (the detection current Id, the detection voltage Vd) from the current detecting unit 6.

The load modules 2a and 2b have the organic EL 4a with the parasitic capacitance Cp. The load module 2a has a connection unit 5c at an output side thereof, and the load module 2b has a connection unit 5d at an input side thereof. The connection units 5c and 5d are connected in parallel to each other.

In the determination unit 7, the detection voltage Vd from the current detecting unit 6 is inputted to an input terminal of a switch SW1 as well as the positive input terminal of the comparator COMP1. A variable reference voltage Vref1 is inputted to the negative input terminal of the COMP1, and the COMP1 compares the detection voltage Vd to the reference voltage Vref1. As a result of the comparison, when the illumination load 4 is the organic EL, the determination signal of the H level is inputted into a control terminal of the switch SW1 from the RS-FF1. The switch SW1 is closed when the H level signal is inputted to the control terminal, and thereby the detection voltage Vd is inputted to the current-power conversion unit 71.

The switch SW1 is constituted by a 2-contacts switch, and is closed and opened by the output of the RS-FF1. The detection voltage V2 is inputted to the input terminal of the switch SW1 whose output terminal is connected to the current-power conversion unit 71. Instead of the switch SW1, for example, a semiconductor relay utilizing switching devices such as a semiconductor switching element FET or an electrical connecting relay such as an electromagnetic relay may be used.

The current-power conversion unit 71 is provided with current-power conversion characteristics information, and, when the detection current Id is inputted via the switch SW1 based on the detection voltage Vd, supplies a power corresponding to the detection current Id to the drive circuit 8 based on the current-power conversion characteristics information. When there is no input from the switch SW1, the current-power conversion unit 71 outputs the L level signal.

In the current-power conversion characteristics of the current-power conversion unit 71, as the detection current Id becomes smaller, a larger power is outputted and the output power is decreased as the detection current Id increases. The current-power conversion characteristics is provided based on the resonance current (or the resonance voltage) characteristic of the resonant circuit shown in FIG. 10. Referring the resonance current characteristic, the detection current at a fixed frequency (e.g., the frequency fd) becomes smaller in determining the load as the parasitic capacitance Cp increases. Accordingly, as the resonance voltage, i.e., the detection voltage Vd becomes smaller, it is determined that the organic EL has a larger parasitic capacitance. That is, the size of the illumination load 4 can be obtained from a resonance voltage or a resonance current at a fixed frequency, a power supplied to the illumination load 4 can be determined based on the detection current Id.

In the present embodiment, an output frequency to the load can be changed by the drive circuit 8. Accordingly, after the determination unit 7 carries out the detection for the load determination, for example, by using a resonance frequency ranging from several tens kHz to hundreds kHz, an normal operation may be performed at a low frequency ranging from several tens Hz to thousands Hz. In this case, since it is possible to detect the load voltage at a high frequency, the load can be determined promptly after the starting-up. Further, an excessive power output can be prevented by changing the current-power conversion characteristics. For example, provided that the current-power conversion characteristics includes a limit characteristics in which the output power is constant below a predetermined detection voltage, the excessive output can be prevented automatically.

With the present embodiment, in addition to the load determination, the power supply based on the size of the illumination load 4, such as the number of organic ELs, is possible. Further, the high frequency detection of the load current makes it possible to determine the load in a short time after the load starting, thereby preventing uncomfortable feeling, such as a flicker, to users.

Figure 13:
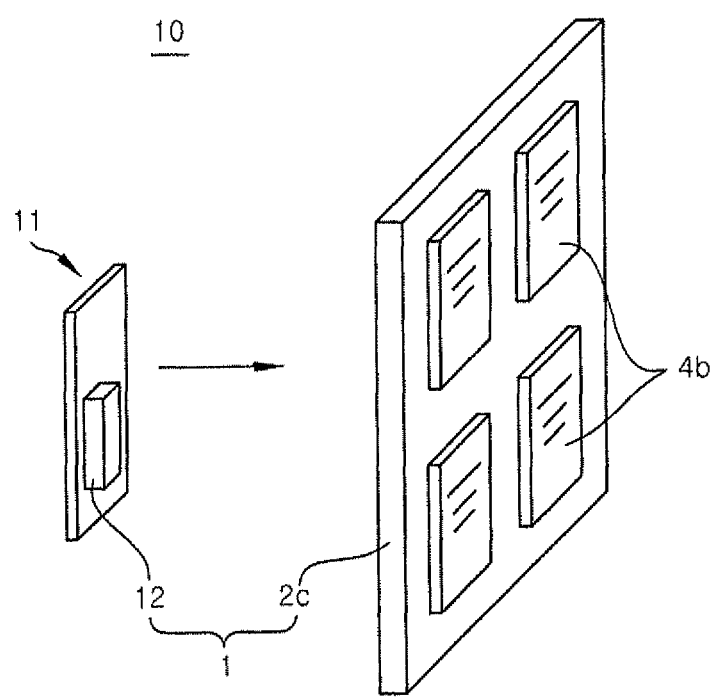
FIG. 13 is a perspective view of an illumination apparatus including the load determination device in accordance with the embodiments.

FIG. 13 shows an illumination apparatus 10 including the load determination device 1. The illumination apparatus 10 includes a power supply module 11 and a load module 2c. The power supply module 11 is provided as one singular unit including: a load determination unit 12 having the voltage applying unit and the determination unit; and a power supplying unit (not shown) for supplying an electric power to the load determination unit 12 provided in the power supply module 11. In the present embodiment, the load determination device 1 includes the load module 2c and the load determination unit 12. The load module 2c is provided by modularizing a plurality of light-emitting devices 4b serving as the illumination load as a unit. The modularization makes the illumination apparatus compact and maintenance such as replacement of the device easier.

The present invention is not limited to the configurations of the above embodiments, but various modifications are possible within the scope of the invention. In the above embodiments, when determining the load, the determination unit 7 may use, for example, the voltage across the connection unit 5, instead of the current detected by the current detecting unit 6. Further, the switching element is not limited to the semiconductor switching element FET, but other semiconductor devices such as a bipolar transistor may be used. Furthermore, a transformer or the like may be used for the current detection, although the resistor is used.

While the invention has been shown and described with respect to the embodiments, it will be understood by those skilled in the art that various changes and modification may be made without departing from the scope of the invention as defined in the following claims.

What is claimed is:

1. An illumination load determination device comprising:
   an illumination load;
   a voltage applying unit for applying a voltage to the illumination load;
   a connection unit for connecting the illumination load and the voltage applying unit;
   a detection unit for detecting at least one of a current flowing through the illumination load and a voltage across the illumination load when the voltage is applied to the illumination load from the voltage applying unit via the connection unit; and
   a determination unit for determining a type of the illumination load based on an output from the detection unit,
   wherein the determination unit has a comparator for comparing a detection value detected by the detection unit to a predetermined threshold, and determines whether or not the illumination load has a capacitance based on an output of the comparator; and the voltage applying unit lights on the determined illumination load with a rated driving voltage.

2. The illumination load determination device of claim 1, wherein the determination unit applies a voltage less than a rated driving voltage of the illumination load from the voltage applying unit to determine the illumination load.

3. The illumination load determination device of claim 1, wherein the determination unit calculates the capacitance of the illumination load based on a maximum value detected by the detection unit in a predetermined time period after the voltage applying unit starts applying the voltage to the illumination load, when determining that the illumination load has the capacitance.

4. The illumination load determination device of claim 1, wherein the voltage applying unit has an inductance through which an electric power is supplied to the illumination load, the inductance constituting a resonant circuit together with the capacitance of illumination load; and
   the voltage applying unit applies the voltage to the illumination load at a resonance frequency of the resonant circuit when the determination unit determines the illumination load.

5. The illumination load determination device of claim 4, wherein the determination unit determines the illumination load based on a resonance voltage from the resonant circuit.

6. The illumination load determination device of claim 4, further comprising:
   a current-power conversion unit for converting a electric current into a electric power and outputting the electric power, the current-power conversion unit having current-power conversion characteristics,
   wherein the voltage applying unit adjusts the supply power for driving the illumination load based on a control power from the current-power output unit.

7. The illumination load determination device of claim 1, wherein the determination unit changes the threshold with the time.

8. An illumination apparatus including the illumination load determination device of claim 1.

* * * * *